United States Patent [19]
Basseet

[11] 3,907,682
[45] Sept. 23, 1975

[54] PURIFICATION OF INDUSTRIAL WASTE WATER

[75] Inventor: Robert Auguste Basseet, St.-Germain-en-Laye, France

[73] Assignees: Regie Nationale des Usines Renault, Billancourt; Automobiles Peugeot, Paris, both of France

[22] Filed: July 11, 1974

[21] Appl. No.: 487,389

[30] Foreign Application Priority Data
July 27, 1973 France .............................. 73.27690
May 14, 1974 France .............................. 74.16665

[52] U.S. Cl. ................ 210/114; 210/121; 210/149; 210/187; 210/519; 210/540
[51] Int. Cl.² ........................................ B01D 23/00
[58] Field of Search .......... 210/149, 181, 182, 183, 210/187, 320, 519, 537, 540, 119, 121, 114

[56] References Cited
UNITED STATES PATENTS

| | | | |
|---|---|---|---|
| 2,284,737 | 6/1942 | Hirshstein | 210/540 X |
| 2,479,386 | 8/1949 | Matheis | 210/540 |
| 2,825,422 | 3/1958 | Schoenfeld | 210/537 X |
| 2,935,197 | 5/1960 | Marple | 210/149 X |
| 2,942,733 | 6/1960 | Thompson | 210/187 X |
| 2,982,414 | 5/1961 | Hirshstein | 210/149 |
| 3,684,703 | 8/1972 | Marmo | 210/537 X |

FOREIGN PATENTS OR APPLICATIONS
47,440   4/1911   Germany .......................... 210/187

Primary Examiner—John Adee
Assistant Examiner—Robert H. Spitzer
Attorney, Agent, or Firm—Brooks Haidt Haffner & Delahunty

[57] ABSTRACT

This invention relates to apparatus for purifying industrial waste water so that the various phases of different density in such waste water can be separated.

The apparatus may comprise a tank to receive the water, this tank including a plurality of compartments. A first compartment has an anti-turbulence partition and a thermal partition, and a heating device or member having a large heat-exchange area is arranged in the first compartment. The heating device when operated sets up convection currents between these two partitions to facilitate the separation of the phases. The anti-turbulence partition may take the form of a perforated plate and the heating device is controlled by a regulating thermostat.

11 Claims, 9 Drawing Figures

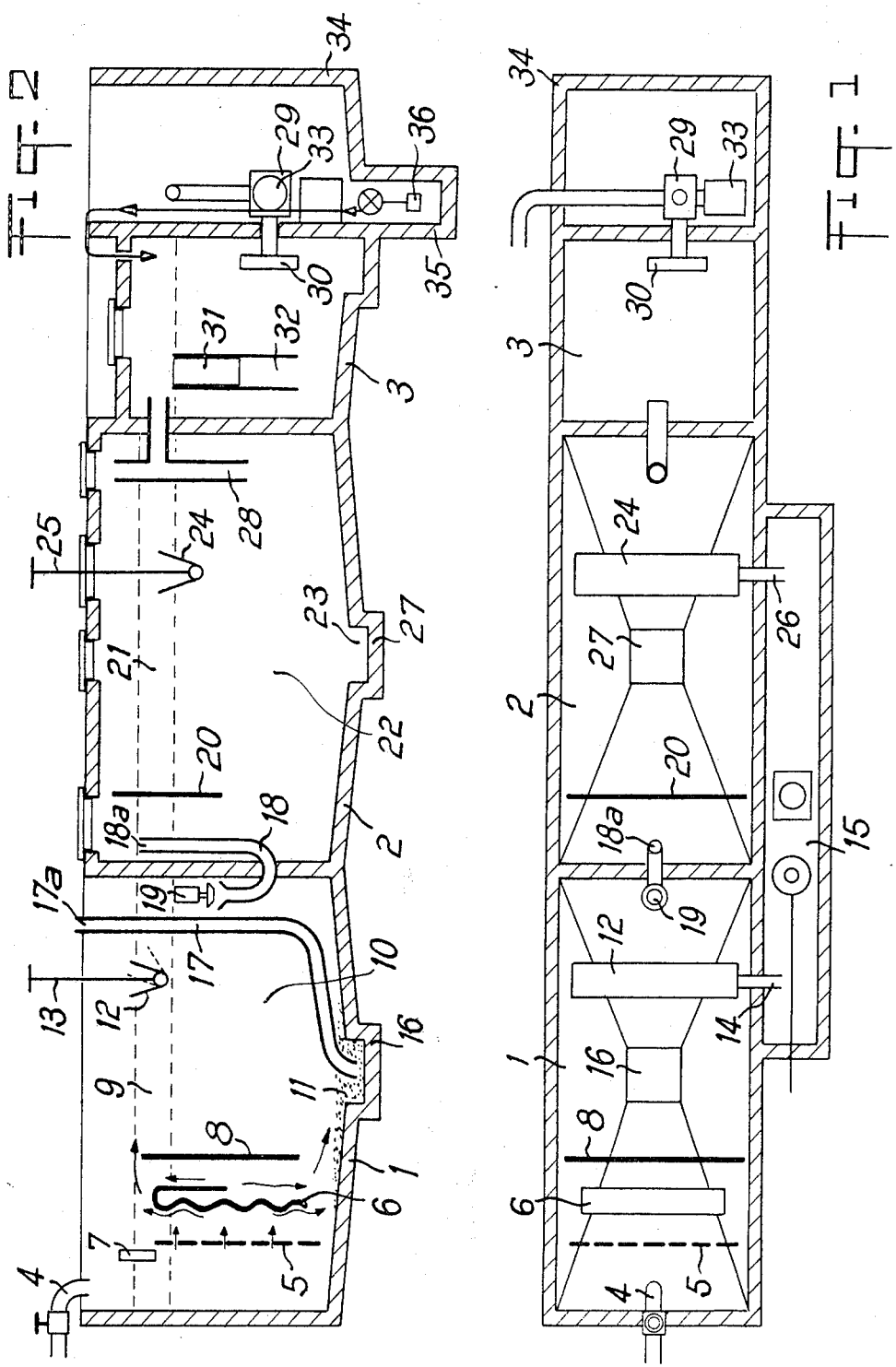

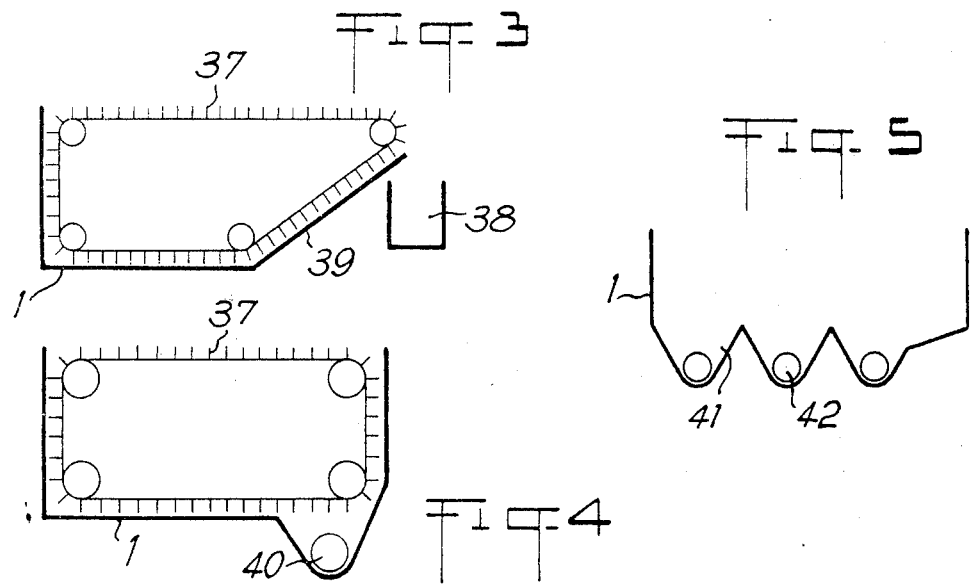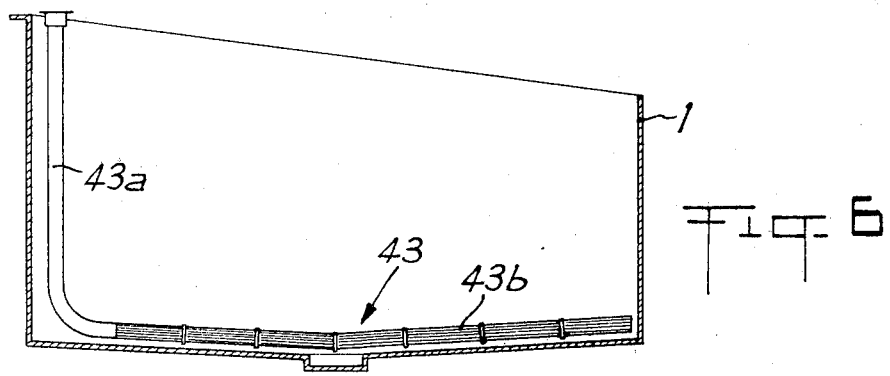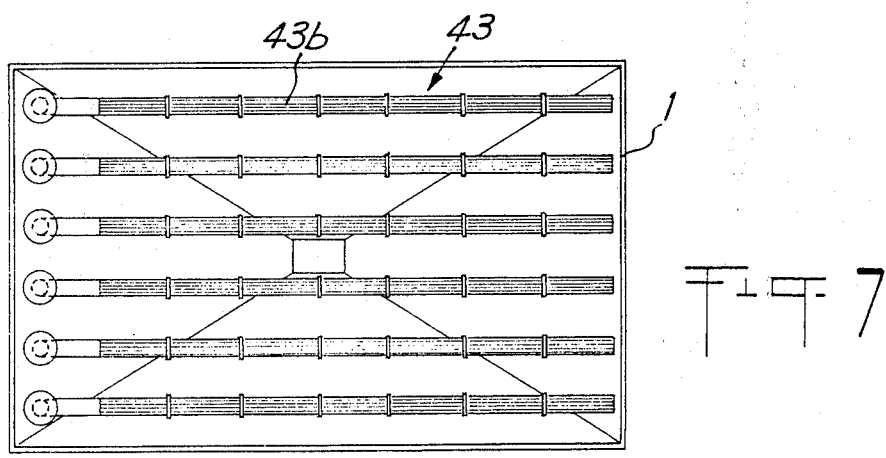

PURIFICATION OF INDUSTRIAL WASTE WATER

BACKGROUND OF THE INVENTION

The present invention relates to apparatus for purifying used industrial waste water.

The apparatus of the invention is applied in particular to industrial waste water containing up to 10% by volume of products which are prohibited from being discharged into the natural environment and which are chiefly, but not exclusively, formed by soluble oils or chemically synthesised liquids which are used as additives in cutting and cooling liquids for machine tools used for metal working.

Such used water is generally subjected to a known cycle of successive treatments which consist firstly of a pre-treatment intended to remove the major proportion of the phases which are lighter and heavier than water, then of a physical and chemical treatment intended to remove the last traces of substances in suspension in the water by causing them to flocculate as a result of mixing with aluminium sulphate to which have been added lime and various polyelectrolytes. Finally the liquid is subjected to a biological regeneration treatment which removes materials in solution such as nitrites, phosphates etc., and it is then discharged into the natural environment.

The present invention relates to an apparatus which is located at the first stage of regeneration, that is to say where the pre-treatment intended to separate the light and heavy phases and the water takes place.

Previously the pre-treatment in question was carried out in a decanting tank, the separation of the three phases taking place merely under the influence of the force of gravity and the differences in density, which consequently made it impossible for the liquid volume to be renewed at a rapid rate.

SUMMARY OF THE INVENTION

In accordance with the invention, an apparatus is used in which a first compartment of a pre-treatment tank having a plurality of compartments is arranged between an anti-turbulence partition and a thermal partition; with a heating device having a large heat-exchange area setting up, in a pre-determined volume between said anti-turbulence and said thermal partitions, convection currents which facilitate the separation of the phases making up the water received into said tank.

This apparatus enables the rise of the light phase and the settling of the heavier phase to be accelerated.

Other features and advantages of the invention will become apparent from a perusal of the following description and of the accompanying drawings, in which:

FIG. 1 is a plan view of a purifying apparatus according to the invention,

FIG. 2 is a longitudinal cross-section through the apparatus shown in FIG. 1,

Figure 8:
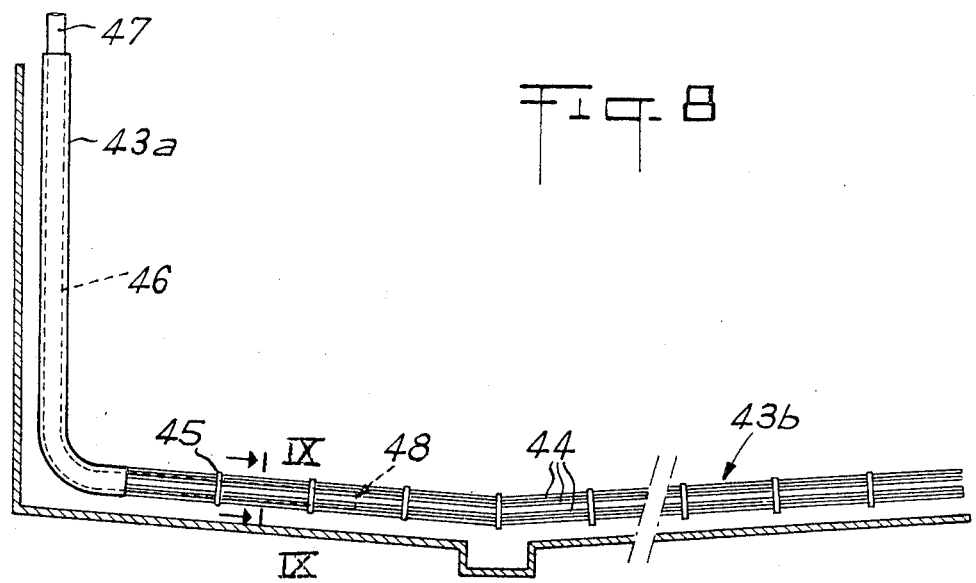
Figure 9:
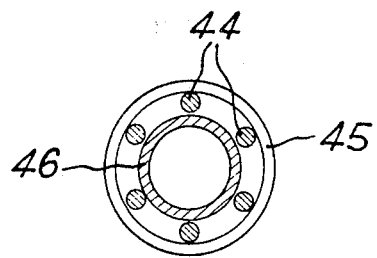

FIG. 3 is a cross-section of a known discharge device, which may be used with the apparatus and which employs a scraper-chain, FIG. 4 is a cross-section of another embodiment of the scraper-chain device shown in FIG. 3, FIG. 5 is a cross-section of another known discharge device which may be used with the apparatus and which employs Archimede screws, FIG. 6 is a cross-section and elevation of apparatus according to the invention for discharging the heavy phase, FIG. 7 is a plan view of the apparatus shown in FIG. 6, FIG. 8 is a view to an enlarged scale of one of the members forming the apparatus, and FIG. 9 is a cross-section along line IX — IX of FIG. 8,

DETAILED DESCRIPTION OF PREFERRED EMBODIMENTS

Referring now to the drawings, in FIGS. 1 and 2 is shown apparatus for purifying industrial waste water which comprises a tank made up of three compartments, 1, 2 and 3 through which the liquid must flow in succession.

In the first compartment 1 the liquid to be treated, which is admitted through a valve 4, first of all meets an anti-turbulence partition which is formed by a perforated plate 5. The object of the partition is to break the force of the flow of liquid before it comes into contact with a heating device consisting of a wall 6 which is heated by any means whatever employing air, steam or electrical current. The temperature of the heating wall 6, which may vary from 50° to 200°C, is controlled by a regulating thermostat 7. The heating wall 6 is of a corrugated configuration which provides a large area of contact with the liquid and thus satisfactory heat exchange.

After the heating area 6 is arranged a thermal i.e. heat insulating partition 8 which, in conjunction with the perforated plate 5, makes it possible for a certain volume of liquid to be defined, the temperature of which lies between 50° and 100°C and in which convection currents are set up around the heating device 6, with the hot liquid rising and the cold liquid making its way towards the bottom of the compartment 1. This makes it possible to separate the various phases contained in the incoming water in such a way that a state of equilibrium is set up in compartment 1 in which the light phase 9, the intermediate phase 10 and the heavy phase 11 come to lie one above the other.

The light phase 9 is removed by means of a trough 12 which is mounted in the upper part of compartment 1 and extends across substantially the whole of its width, the said trough being capable of being tilted when acted upon by a control means 13 or any other equivalent means. The trough 12, which is shown in the rest position, may be moved to a tilted position (shown in broken lines in FIG. 2) in which the light phase 9 of the liquid is able to gain access to the interior of the trough. At the end, the trough 12 has a pipe 14 which discharges into a laterally arranged discharge tank 15 in which the said light phase 9 of the liquid is collected so as to be either removed or re-used.

The heavy phase 11 which collects at the bottom of compartment 1 is picked up by suction from the sump 16 by means of a low-pressure pipe 17, the lower part of which is perforated and the upper part 17a of which is connected to a suction device. The intermediate phase 10 of the liquid, from which approximately 99% of the foreign material has been removed by a single pre-treatment process, is led into compartment 2 through a syphon 18 which passes through the wall separating compartments 1 and 2. It is possible for syphon 18 to be fitted at the inlet with a float valve 19 which is capable of taking up either a raised position in the case of densities which are close to that of the intermediate phase which is intended to pass through to compartment 2 and whose density is equal to 1 or a lower, closed position when its float enters the light phase 9 the density of which is less than 1. The object of this arrangement is to prevent the light phase 9 from flowing into compartment 2 in the event of the level of the liquid to be treated dropping in compartment 1. Following output opening 18a is an anti-turbulence partition 20 which is intended to prevent turbulence in the compartment 2 into which the incoming liquid is decanted before passing into the next compartment 3.

The liquid coming from compartment 1 separates as before into three phases 21, 22, 23, and the light phase 21 forms a surface layer which, as in the previous stage, is removed by means of a trough 24 which is able to be tilted by a means 25 in the manner described above. The trough 24 has a pipe 26 which feeds into the same discharge tank 15 as trough 12.

The last traces 23 of the heavy phase collect in a sump 27 from which they are periodically removed by any suitable means (a pump, a trap-door, etc.). The phase of intermediate density 22 passes through a separating tube 28 which discharges into compartment 3 of the tank and it is collected from this compartment by a discharge pump 29, the strainer 30 of which passes into compartment 3. Pump 29 feeds the pre-treated water to external treatment devices.

In compartment 3 is arranged a float 31 which is mounted in a guide tube 32 and which moves with the level of the liquid and controls, by means of contacts, the operation of a motor 33 which drives pump 29. The pump is started up when float 31 is in the raised position and is kept running until the float has sunk to its extreme lower position.

The pump 29 is situated in an enclosure 34 which also contains various monitor means and electrical control means. At the bottom of the enclosure 34 is a sump 35, which is provided with a drain pump 36 for removing seepage water (leaks, etc).

A number of other known devices may, if desired, be employed to remove the heavy phase.

For example, in the apparatus shown in FIG. 3, there is shown in tank 1 a known scraper chain 37 which may expel the phase of greatest density along an inclined wall 39 and into a receptacle 38 or which, as shown in FIG. 4, may force the said phase into a collection space 40, from which, however, it is still necessary to make provision for it to be removed.

Another known arrangement is shown in FIG. 5, where the bottom of the tank contains recesses 41, in which Archimedean screws 42 operate to carry along the products forming the heavy phase.

However, these known arrangements have a certain number of drawbacks and, in particular, they make it necessary for a large number of moving parts to be employed, resulting in rapid wear and high construction costs. They also set up currents which disturb the separation area and they require careful maintenance and looking-after.

Therefore, in accordance with the present invention, the means of removing the heavy phase which has separated out from the liquid is preferably formed by a series of open-work horizontal members arranged parallel to the bottom of the tank which form guide members in which flexible tubes are movable with a reciprocating motion, one end of these tubes being connected to a suction source and the other end containing an opening for inducing the heavy phase.

This makes it possible for the construction of the tank to be simplified since the bottom of the tank may be flat due to the fact that the arrangement covers the whole area of the bottom. On the other hand, where suction only takes place at a single point, the bottom of the tank needs to have tapering walls so as to collect the phases to be removed at a point which is determined by the siting of the device which provides the localised suction.

Operation of the apparatus is simple, since there are practically no moving parts, precision-made parts, parts which wear quickly, or parts which may give rise to mechanical mishaps which call for something to be done beneath the surface of the water.

The apparatus is capable of covering large areas at low cost.

In FIGS. 6 and 7 is shown a tank 1 which is open at the top. This tank is similar to compartment 1 of the tank shown in FIG. 1 which contains the heating element which brings about the separation of the liquid phases which are to be purified.

A series of members 43 are arranged in tank 1 side by side with spaces between them and rest on the bottom of the tank. Each member consists of a first vertical section 43a which is formed by a solid-walled tube and a second horizontal open-work section 43b extends for practically the whole of the length of the tank.

The second, open-work section 43b, which is shown in greater detail in FIGS. 8 and 9, consists of a plurality of longitudinal rods 44 the number of which may vary depending on the total open area which it is desired to obtain, and of transversely spaced annular ties which hold together the rods 44.

In the embodiment shown in FIGS. 8 and 9, six longitudinal rods 44 are used and these are linked by ties 45 arranged approximately every meter.

Inside each member 43 is arranged a flexible tube 46 (FIGS. 8 and 9) which is intended to suck in the heavy phase situated at the bottom of the tank.

To this end, the flexible tube 46 is mounted to slide in member 43 and is operated by drive means which are not shown in the drawing.

Also, end 47 of flexible tube 46 is connected to a suction source so that it is able to suck in the heavy phase from the bottom of the tank through the orifice 48 arranged at the other end.

In operation, that is to say, in an intake period, the flexible tube 46 which fits into the first section 43a formed by the solid-walled tube, is fed into the second, open section 43b and a reciprocating motion is imparted to it so that opening 48 moves alternately along the whole length of the open section 43b. Due to the low pressure existing in tube 46 the deposit at the bottom of the tank is drawn in through opening 48 from one end of its traverse to the other. The fact that there are a number of members 43 enables the whole area of the bottom of the tank to be scavenged.

Various modifications may of course be make to the apparatus or methods which have just been described solely as non-limiting examples, without departing from the scope of the invention as defined by the appended claims.

I claim:

1. Apparatus for purifying industrial waste water for separating the various phases of different density in such waste water, said apparatus comprising a pretreatment tank to receive said water, said tank including a plurality of compartments, a first one of said compartments having an anti-turbulence partition and a thermal partition spaced from said anti-turbulence partition, a heating device having a large heat-exchange area disposed in said first compartment, said heating device being operative to set up, in a predetermined volume between said anti-turbulence and said thermal partitions, convection currents which facilitate the separation of the phases making up the water received into said tank, and suction pipe means in said first compartment for removing the heavy phase which has separated out from said water comprising a series of horizontal open-work members arranged parallel to the bottom of the tank, said open-work member forming guide members in which flexible tubes are movable with a reciprocating motion, one end of said tubes being connected to suction and the other end of said tubes containing an opening for inducing the heavy phase.

2. Apparatus according to claim 1, wherein said horizontal members are formed by spaced longitudinal rods connected by means of ties arranged transversely of said rods at regular intervals.

3. Apparatus according to claim 1, wherein said horizontal guide members extend vertically into solid-walled tubes in which said flexible tubes are arranged.

4. Apparatus for purifying industrial waste water for separating the various phases of different density in such waste water, said apparatus comprising a pretreatment tank to receive said water, said tank including a plurality of compartments, a first one of said compartments having an inlet for receiving waste water and filling said one compartment with waste water to a predetermined level and an outlet for discharging waste water from which at least a portion of at least one of said phases has been removed, an anti-turbulence partition in said one compartment adjacent said inlet, a vertically disposed thermal partition in said one compartment extending at least substantially across said one compartment and spaced from said anti-turbulence partition and intermediate the latter and said outlet, said thermal partition also being disposed so as to be immersed in said waste water, and a heating device intermediate said anti-turbulence partition and said thermal partition and disposed so as to be contacted by said waste water, said one compartment being substantially unobstructed with respect to the passage of water convection currents in the vertical direction with respect to said heating device and from said heating device to said predetermined level so as to permit waste water heated by said heating device to rise vertically to said predetermined level.

5. Apparatus according to claim 4 wherein said anti-turbulence partition is a vertically disposed perforated plate with the perforations thereof extending from the side thereof nearer said inlet to the side thereof nearer said heating device to permit the flow of said waste water from said inlet to said heater through said perforations.

6. Apparatus according to claim 4 further comprising a thermostat disposed adjacent said heating device and so as to be immersed in the waste water heated by said heating device and connected to said heating device for control of the latter.

7. Apparatus according to claim 4 further comprising a first tiltable trough in said one compartment and a second tiltable trough in a second one of said compartments, each said trough having sides which extend at least substantially across the compartment in which it is located and each said trough being tiltable about an axis substantially parallel to said sides, said sides of said first trough, in the untilted position of the latter, extending above said predetermined level for preventing the flow of water into said first trough, at least one discharge tank and means connecting each said trough to a said discharge tank.

8. Apparatus according to claim 4 further comprising a U-shaped tube extending from said one compartment to the next adjacent one of said compartments, said tube having a pair of legs with openings at their ends, one said leg being shorter than the other and said tube being disposed with the opening of said shorter leg in said first one of said compartments at a further level below said predetermined level and being disposed with the opening of said other leg in said next adjacent one of said compartments at a level above said further level, and a float valve in said first one of said compartments and responsive to the densities of said phases and connected to said opening of said shorter leg for closing said last-mentioned opening at least when the lightest of said phases reaches said further level.

9. Apparatus as claimed in claim 4 further comprising a suction pipe extending adjacent the bottom of said first one of said compartments for removing the heaviest of said phases.

10. Apparatus as claimed in claim 4, further comprising a strainer in a third one of said compartments and disposed to be immersed in water therein, a pump connected to said strainer for withdrawing water from said third one of said compartments, and float means in said last-mentioned one compartment and responsive to the water level therein for controlling the operation of said pump.

11. Apparatus according to claim 10 further comprising an enclosure adjacent said third one of said compartments, said pump being located in said enclosure and said enclosure comprising a sump, and a drain-pump connected to said sump.

* * * * *